(12) United States Patent
Chien et al.

(10) Patent No.: US 8,027,551 B2
(45) Date of Patent: Sep. 27, 2011

(54) RECONFIGURABLE IMAGE PROCESSOR AND THE APPLICATION ARCHITECTURE THEREOF

(75) Inventors: Shao Yi Chien, Taipei County (TW); Chih Chao Chen, Taipei County (TW); Chun Fu Shen, Taipei County (TW); Wan Kuei Lin, Taipei County (TW)

(73) Assignee: Vivotek Inc., Taipei (TW)

(*) Notice: Subject to any disclaimer, the term of this patent is extended or adjusted under 35 U.S.C. 154(b) by 1152 days.

(21) Appl. No.: 11/806,623

(22) Filed: Jun. 1, 2007

(65) Prior Publication Data

US 2008/0114974 A1    May 15, 2008

(30) Foreign Application Priority Data

Nov. 13, 2006 (TW) .................................. 95141861 A

(51) Int. Cl.
*G06K 9/54* (2006.01)
*G06F 7/38* (2006.01)

(52) U.S. Cl. ........................................ 382/307; 712/228

(58) Field of Classification Search ................. 382/307, 382/100; 712/226, 227, 228
See application file for complete search history.

(56) References Cited

U.S. PATENT DOCUMENTS

| | | | | |
|---|---|---|---|---|
| 4,783,782 | A * | 11/1988 | Morton | 714/10 |
| 5,522,083 | A * | 5/1996 | Gove et al. | 712/22 |
| 6,247,036 | B1 * | 6/2001 | Landers et al. | 708/603 |
| 7,171,542 | B1 * | 1/2007 | Alfano et al. | 712/38 |
| 2007/0101107 | A1 * | 5/2007 | Isobe | 712/226 |
| 2007/0250593 | A1 * | 10/2007 | Sikdar et al. | 709/217 |

* cited by examiner

*Primary Examiner* — Yon Couso
(74) *Attorney, Agent, or Firm* — Birch, Stewart, Kolasch & Birch, LLP

(57) ABSTRACT

A reconfigurable image processor for image processing includes an arithmetic module, a first memory unit, a bus control module and a connecting module. By setting different configurations or configuring connections among arithmetic units via the connecting module, the operations of arithmetic units are reconfigured to include different functions. The present invention provides an application architecture including a sensor module, a display module, a second memory unit and a reconfigurable image processor.

53 Claims, 13 Drawing Sheets

RECONFIGURABLE IMAGE PROCESSOR AND THE APPLICATION ARCHITECTURE THEREOF

BACKGROUND OF THE INVENTION

1. Field of the Invention

The present invention relates to an image processing technology, particularly to a reconfigurable image processor capable of realizing two types of image processing modes by using a single set of hardware and the application architecture thereof.

2. Description of the Prior Art

Nowadays, digital imaging is widely applied in diverse fields and electronic products. For example, digital cameras are the commonest ways of generating digital images. Generally speaking, digital cameras support dual-mode functionalities: preview mode and capture mode. In the capture mode, the display module rapidly displays preview images, thus needing real-time image display at reduced resolution. The preview mode is designed to support digital cameras in photographing video information. On the contrary, the capture mode is designed to capture high-resolution images, thus demanding high quality. As high-quality images are stored in the memory, processing of the images are relatively not real-time.

Nowadays, image processors for digital cameras exist in two types. The first type is a digital signal processor (DSP) having a specific preview engine realized through integrated circuits (ICs). By combining two sets of hardware circuits into an IC, data flow is directly output to the display module to rapidly display preview images, after being processed by the preview engine in the preview mode. In this way, the data flow is not processed by a digital signal processor. On the contrary, in the capture mode, data flow is processed by the digital signal processor and stored in the memory, such that data flow is not processed by the preview engine. The advantage of the latter is: algorithms can be arbitrarily changed during image capture because of the availability of a digital signal processor, making it highly flexible. However, a drawback exists because a different set of hardware is required for the preview mode and the capture mode, and a digital signal processor is needed in the capture mode, thus slowing down processing.

The second type of image processors is designed as application specific integrated circuits (ASIC). The advantage is: image-processing capability is strong because the entire image processing process is realized by specific hardware. However, a drawback exists because the replacement of algorithms inside the ASIC is not possible, causing unsatisfactory flexibility. Considering that hardware design should take real-time processing and high-flexibility into account, optimal image processing is difficult to be realized, often causing excessive investments in hardware.

SUMMARY OF THE INVENTION

The primary object of the present invention is to provide a reconfigurable image processor and the application architecture thereof for image processing. By setting different configurations, a single set of hardware in the present invention can realize the second type of image processing mode on the basis of the preview engine, thereby lowering costs.

To achieve the above objects, the reconfigurable image processor of the present invention for image processing includes an arithmetic module, a first memory unit, a bus control module and a connecting module, wherein the arithmetic module includes a plurality of reconfigurable arithmetic units, which are reconfigured to perform corresponding data processing actions. The first memory unit, which is coupled to the arithmetic module, stores a plurality of configurations. The bus control module is coupled to the first memory unit and the system bus for being coupled to an external device, while the connecting module is coupled to the arithmetic module, the first memory unit and the bus control module. By setting different configurations, the connecting module reconfigures the connections among the reconfigurable arithmetic units, making the reconfigurable image processor support different functionalities. In this way, the reconfigurable image processor can flexibly change internal operational functions depending on different situations.

To achieve the above objects, the present invention provides an application architecture for a reconfigurable image processor, including a sensor module, a display module, a second memory unit and a reconfigurable image processor, wherein the sensor module acquires raw sensor data. The reconfigurable image processor having a first memory unit is coupled to the sensor module, the display module and the second memory unit. The first memory unit stores a plurality of configurations. By setting different configurations, the reconfigurable image processor reconfigures internal connections and provides the reconfigurable arithmetic units with individually different functionalities to perform corresponding actions. In this way, the application architecture for the reconfigurable image processor can flexibly change their operational functionalities depending on different situations.

According to a preferred embodiment of the present invention, the bus control module includes an input unit, an output unit and a bus wrapper. The input unit and the output unit are respectively coupled to the connecting module, and the bus wrapper is coupled to the input unit, the output unit, the first memory unit and the system bus.

According to another preferred embodiment of the present invention, the connecting module includes a plurality of multiplexers. The connection of the multiplexers can be controlled via the configurations, such that the connecting module reconfigures connections among the reconfigurable arithmetic units.

According to another preferred embodiment of the present invention, the first memory unit includes a plurality of context memories.

According to another preferred embodiment of the present invention, the reconfigurable arithmetic units individually include a context register, an input source selector, a datapath unit, an output register and a module controller, wherein the context register is coupled to the first memory unit. The input source selector is coupled to the connecting module and the context register. The datapath unit is coupled to the context register and the input source selector for performing data operations, while the output register is coupled to the connecting module and the datapath unit for storing output data. The module controller is coupled to the context register, the datapth unit, the output register and the connecting module for transmitting synchronous signals.

According to another preferred embodiment of the present invention, the module controller inputs a first synchronous signal and outputs a second synchronous signal to the next stage. During operations, the reconfigurable arithmetic units process the input data and the first synchronous signal. The module controller analyzes the first synchronous signal and controls the datapath unit so as to retrieve valid data within a time frame and generate the second synchronous signal to the next stage.

According to another preferred embodiment of the present invention, the context register, the input source selector, the datapath unit, the output register and the module controller can be individually controlled by setting different configurations to perform different operations.

According to another preferred embodiment of the present invention, the reconfigurable arithmetic unit is a reconfigurable color filter array (CFA) interpolation unit for reconfiguring Bayer pattern data into RGB data. The reconfigurable CFA interpolation unit includes a first interpolation operator, a second interpolation operator and a third interpolation operator. The first interpolation operator performs diagonal data operations of a Bayer color filter array (CFA), and the second interpolation operator performs cross-data operations of the Bayer color filter array (CFA), with the third interpolation operator performing final operations. Consequently, the reconfigurable CFA interpolation unit can support the majority of CFA interpolation algorithms available in the literature.

According to another preferred embodiment of the present invention, the reconfigurable arithmetic unit is a reconfigurable pixel-processing unit for performing a plurality of image processing operations. The image processing operations include color correction, brightness/contrast enhancement, hue/saturation enhancement, measurement for 3A (auto white balance, auto exposure, auto focus), gamma correction, color gain adjustment, white balance, etc. The center of the reconfigurable pixel-processing unit includes a look up table and a multiplier and accumulator (MAC). As a result, the reconfigurable pixel-processing unit can process pixel-based operations.

According to another preferred embodiment of the present invention, the reconfigurable arithmetic unit is a reconfigurable line register, which includes, a plurality of multiplexers and a plurality of line buffers, such that the line buffers, which are serially connected to the corresponding multiplexers.

According to another preferred embodiment of the present invention, the reconfigurable arithmetic unit is a reconfigurable window register, which includes a plurality of multiplexers and a plurality of registers, which are serially connected to the corresponding multiplexers.

According to another preferred embodiment of the present invention, each of the plurality of line registers is coupled to the corresponding window registers to form a cache register array to process image data with N×N window, wherein N is an integer.

According to another preferred embodiment of the present invention, the reconfigurable arithmetic unit is a reconfigurable multiplier and accumulator (MAC), which includes a plurality of MACs, an adder tree and a sorting network. By setting different configurations, the reconfigurable MACs can process operations of general image filters.

According to another preferred embodiment of the present invention, the reconfigurable arithmetic unit is a reconfigurable down-sampling module capable of minifying an image for displaying.

According to another preferred embodiment of the present invention, the reconfigurable arithmetic unit is a reconfigurable arithmetic and logic unit (ALU), having at least a basic processing unit, which includes at least a comparator, an arithmetic and logic unit (ALU) and a multiplier. The reconfigurable ALU performs a specific program, which is stored in the first memory unit. By parallel connecting a plurality of basic processing units, the reconfigurable ALUs can execute several types of image processing operations.

According to another preferred embodiment of the present invention, when performing the preview mode, a corresponding configuration is loaded from the first memory unit into the reconfigurable image processor to perform the required image processing procedure. The sensor module then inputs raw sensor data into the reconfigurable image processor. By processing the sensor data, first sensor data are obtained. After performing image-processing operations on the first sensor data for A times, preview images are obtained and then output to the display module, wherein $A \geq 0$ and A is an integer.

According to another preferred embodiment of the present invention, when performing the capture mode, corresponding configurations are loaded from the first memory unit into the reconfigurable image processor. The sensor module then inputs raw sensor data into the reconfigurable image processor. By processing the sensor data and accessing the second memory unit, second sensor data are obtained. After performing image-processing operations on the second sensor data for B times, captured images are obtained and then stored in the second memory unit, wherein $B \geq 1$ and B is an integer.

According to another preferred embodiment of the present invention, the reconfigurable image processor is coupled to at least an external microprocessor via a system bus.

In summary, the present invention provides a reconfigurable image processor and the application architecture thereof. Due to the high homogeneity of image processing operations, the present invention modifies the conventional preview engine into a reconfigurable architecture, such that the reconfigurable image processor can realize the preview mode and the capture mode by using a single set of hardware instead of two sets of hardware required for the conventional technology and can realize two types of image processing modes without losing the flexibility of hardware architecture. Therefore, the present invention can greatly lower the costs for image processing, enhance the image processing speed and keep the hardware architecture highly flexible.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
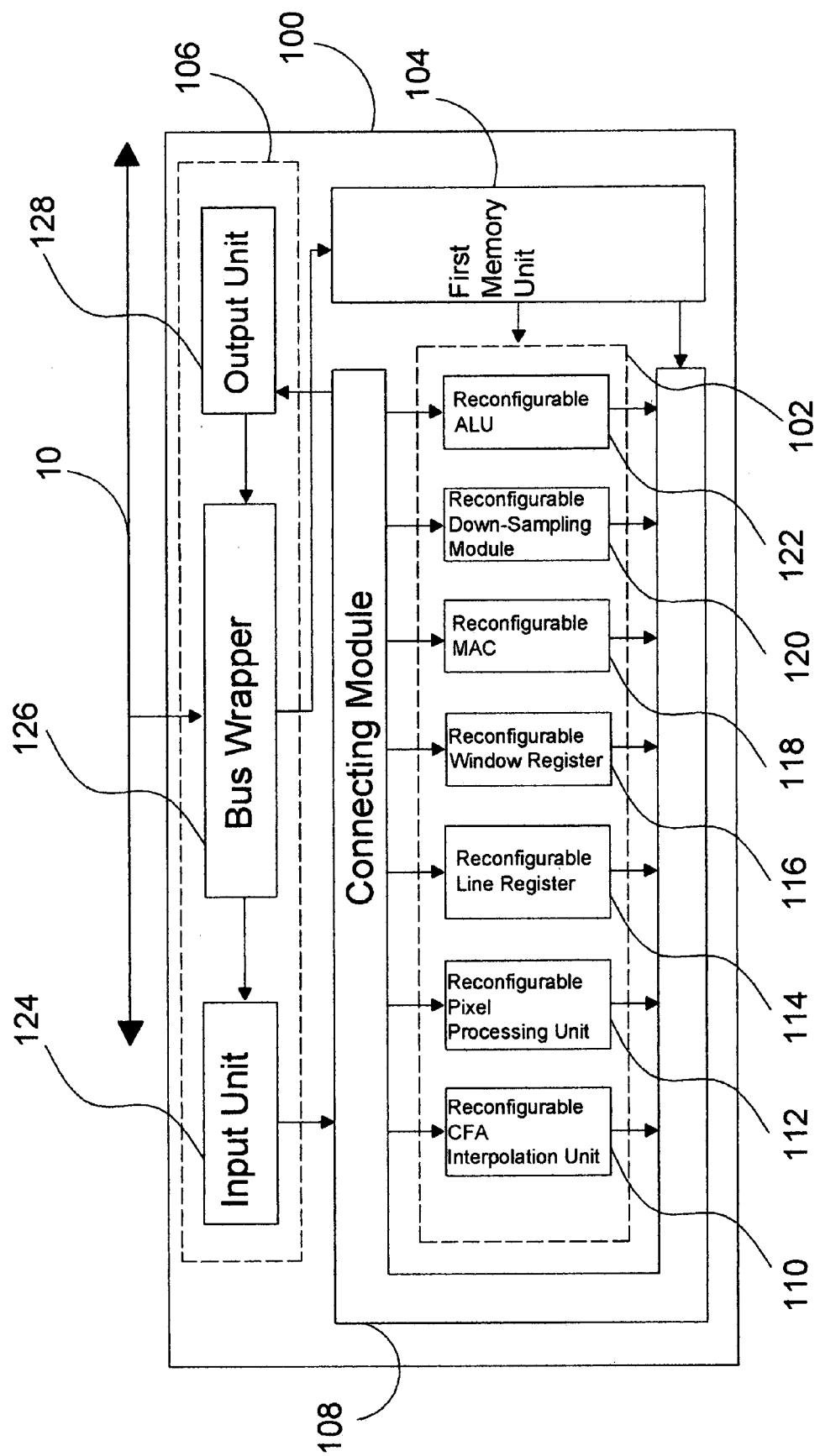
FIG. 1 is a block diagram showing the functions of the reconfigurable image processor made according to a preferred embodiment of the present invention.

Referring to FIG. 1, the reconfigurable image processor 100 includes an arithmetic module 102, a first memory unit 104, a bus control module 106 and a connecting module 108, wherein the first memory unit 104 is coupled to the arithmetic module 102. The bus control module 106 is coupled to the first memory unit 104 and the system bus 10. The connecting module 108 is coupled to the arithmetic module 102, the first memory unit 104 and the bus control module 106.

The arithmetic module 102 includes a plurality of reconfigurable arithmetic units, each of which is individually coupled to the connecting module 108. The reconfigurable arithmetic unit includes a reconfigurable CFA interpolation unit 110, a reconfigurable pixel processing unit 112, a reconfigurable line register 114, a reconfigurable window register 116, a reconfigurable MAC 118, a reconfigurable down-sampling module 120 and a reconfigurable ALU 122. The bus control module 106 includes an input unit 124, a bus wrapper 126 and an output unit 128. The input unit 124 and the output unit 128 are individually coupled to the connecting module 108. The bus wrapper 126 is coupled to the input unit 124, the output unit 128, the first memory unit 104 and the system bus 10. The first memory unit 104 includes at least one context memory.

The arithmetic module 102 includes a plurality of reconfigurable arithmetic units, which are reconfigured to perform corresponding actions, for example, CFA interpolation algorithm. The first memory unit 104 stores at least one configuration. By changing different configurations, the connecting module 108 reconfigures connections among the reconfigurable arithmetic units so as to reconfigure functions of the arithmetic module 102, such that the reconfigurable image processor 100 performs different actions, different algorithms . . . etc. in different image-processing modes, while the hardware inside the reconfigurable image processor 100 can be flexibly used. The connecting module 108 includes a plurality of multiplexers (not disclosed in the drawing). By setting different configurations, the reconfigurable image processor 100 controls the connection mode of the multiplexers, such that the connecting module 108 reconfigures the connections among the reconfigurable arithmetic units.

Figure 2:
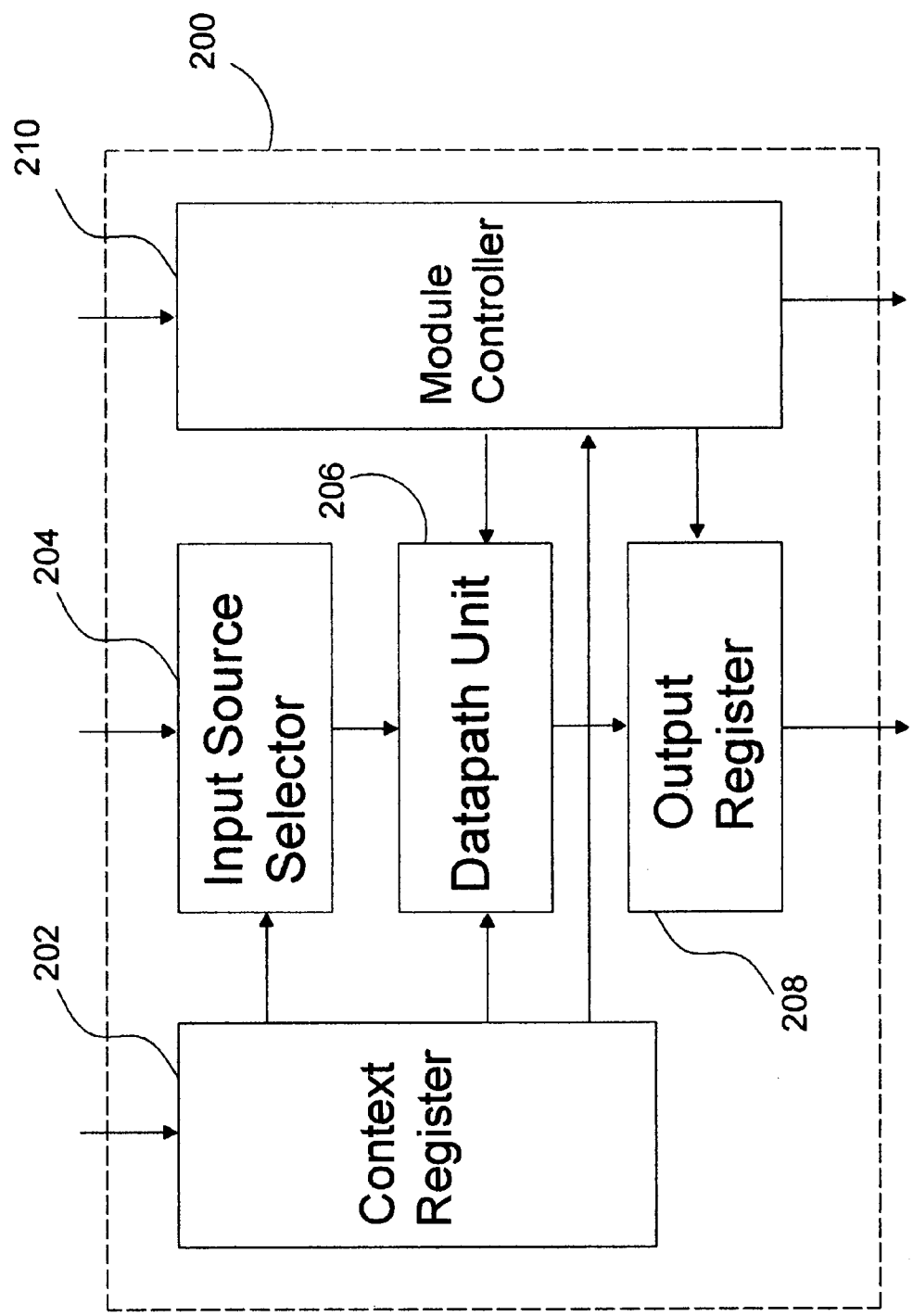
FIG. 2 is a block diagram showing the functions of the reconfigurable arithmetic units made according to a preferred embodiment of the present invention.

Referring to FIGS. 2 and 1, the reconfigurable arithmetic unit 200 includes a context register 202, an input source selector 204, a datapath unit 206, an output register 208 and a module controller 210, wherein the context register 202 is coupled to the first memory unit 104. The input source selector 204 is coupled to the connecting module 108 and the context register 202. The datapath unit 206 is coupled to the context register 202 and the input source selector 204 for performing data operations. The output register 208 for storing output data is coupled to the connecting module 108 and the datapath unit 206. The module controller 210 for transmitting synchronous signals is coupled to the context register 202, the datapath unit 206, the output register 208 and the connecting module 108.

The module controller 210 inputs the first synchronous signal and outputs the second synchronous signal. When operating the reconfigurable arithmetic unit 200, the module controller 210 analyzes the first synchronous signal for processing arithmetic data, controls the datapath unit 206 for retrieving valid data within a time frame and generates the second synchronous signal for the next stage. By setting different configurations inside the context register 202, the reconfigurable arithmetic unit 200 individually controls the input source selector 204, the datapath unit 206, the output register 208 and the module controller 210 for performing individual corresponding actions. In other words, the reconfigurable CFA interpolation unit 110, the reconfigurable pixel processing unit 112, the reconfigurable line register 114, the reconfigurable window register 116, the reconfigurable MAC 118, the reconfigurable down-sampling module 120 and the reconfigurable ALU 122 are all based on the same architecture of the reconfigurable arithmetic unit 200. By setting different configurations, the reconfigurable arithmetic unit 200 having different structures and functions performs corresponding actions, which is a conventional reconfigurable or programmable semiconductor technological application and will not be discussed herein.

When one of the reconfigurable arithmetic units 200 is as a reconfigurable CFA interpolation unit, it can reconstruct Bayer pattern data into RGB data. The reconfigurable CFA interpolation unit 110 further includes a first interpolation operator, a second interpolation operator and the third interpolation operator (the three operators are not disclosed in the drawing). The first interpolation operator performs diagonal (the diagonal elements of the matrix) data operations of a Bayer CFA interpolation, while the second interpolation operator performs cross (the cross elements of the matrix) data operations of the Bayer CFA interpolation, such that the third interpolation operator performs final operations via the operational results of the first interpolation operator and the second interpolation operator.

Figure 3:
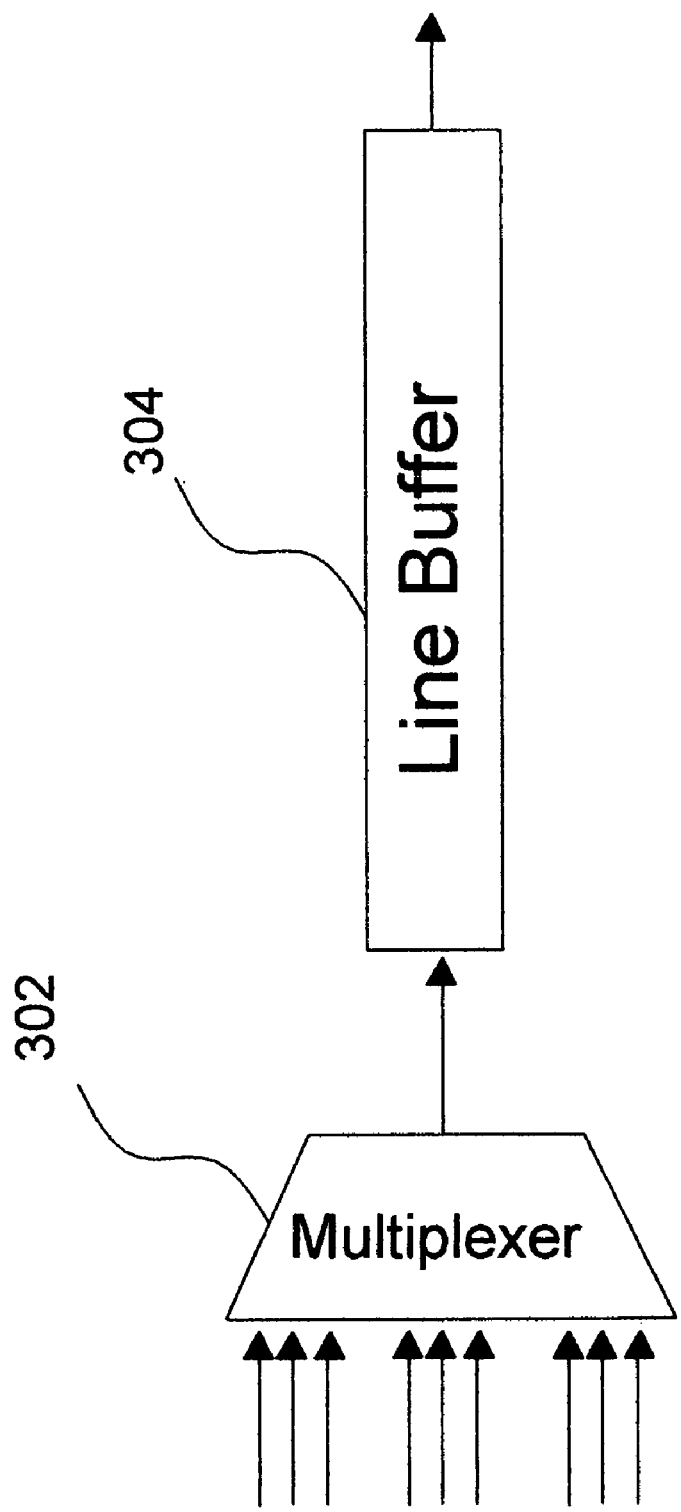
FIG. 3 is a block diagram showing the functions of the single reconfigurable line register made according to a preferred embodiment of the present invention.
Figure 4:
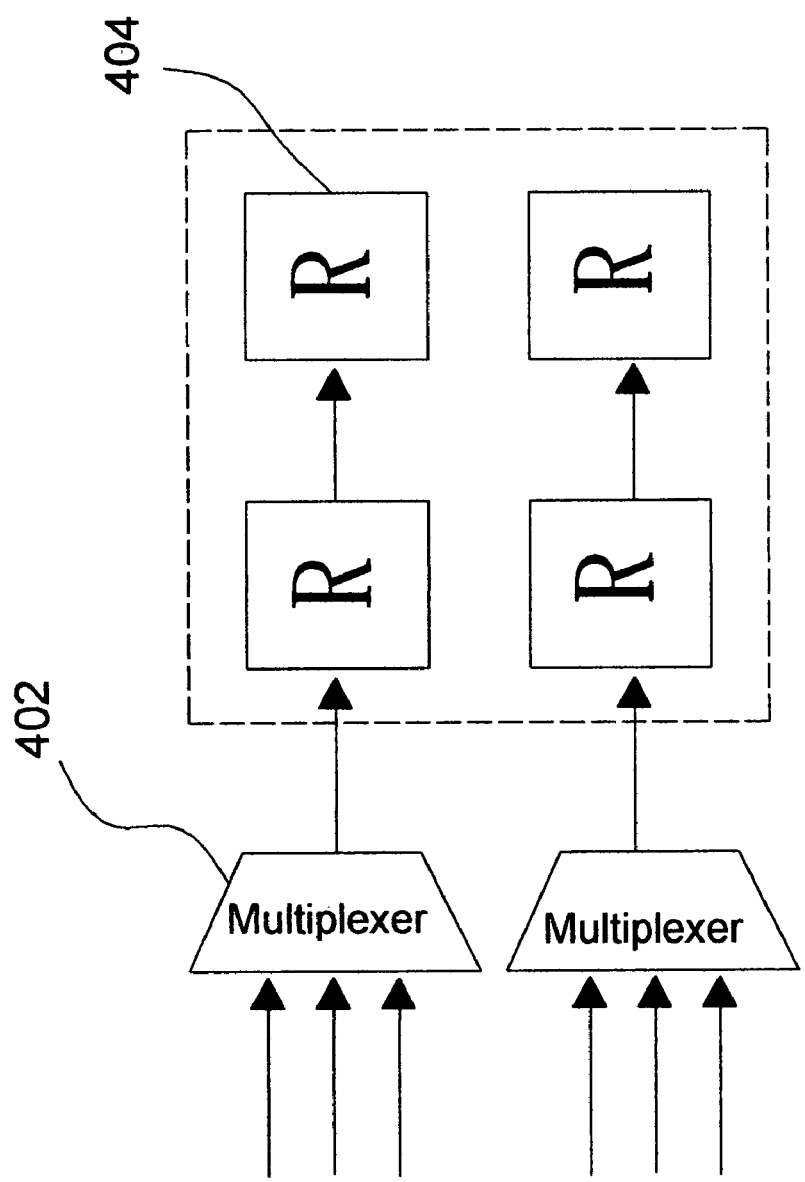
FIG. 4 is a block diagram showing the functions of the 2×2 reconfigurable window register made according to a preferred embodiment of the present invention.
Figure 5:
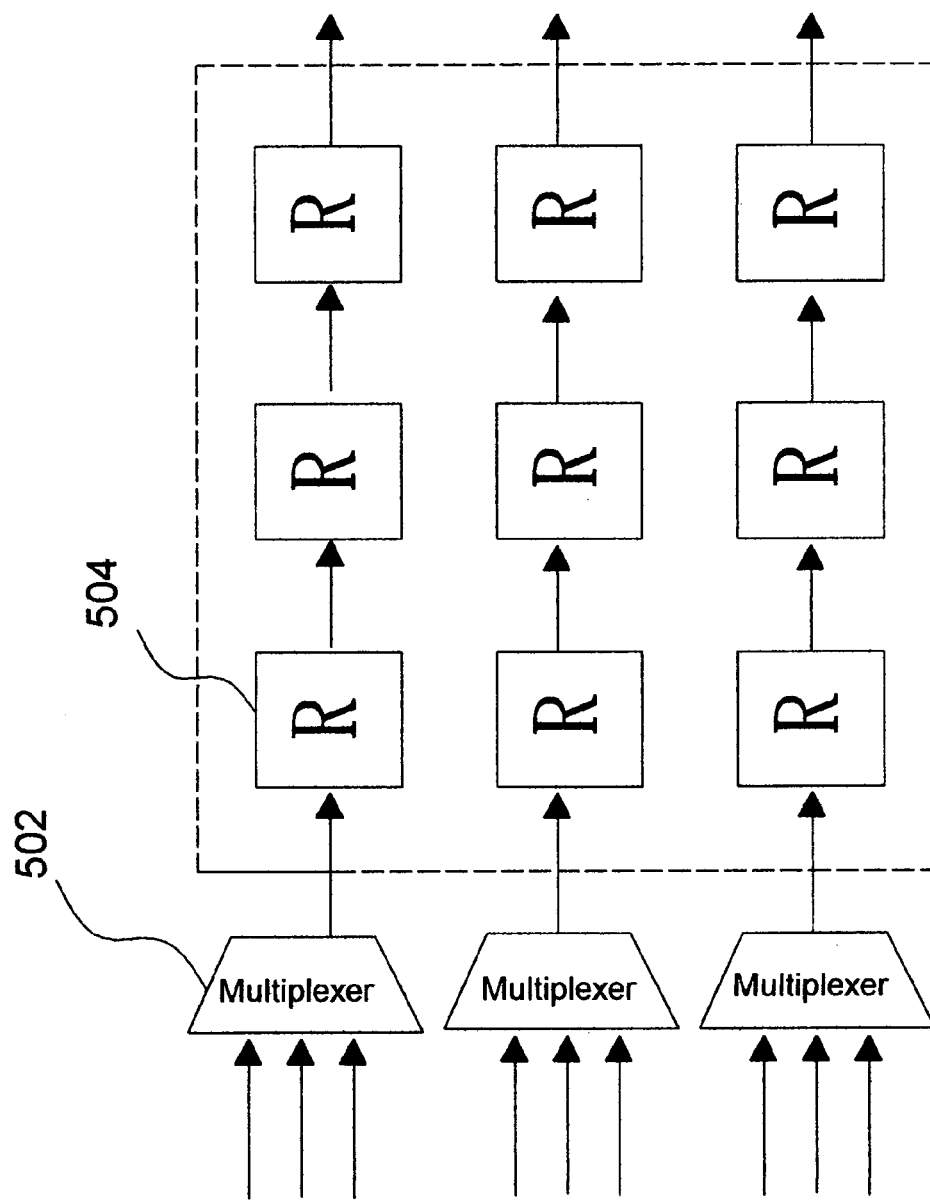
FIG. 5 is a block diagram showing the functions of the 3×3 reconfigurable window register made according to a preferred embodiment of the present invention.

When one of the reconfigurable arithmetic units 200 is as a reconfigurable pixel-processing unit, it performs a plurality of image processing operations, for example, color correction, brightness/contrast enhancement, hue/saturation enhancement, measurement for 3A (auto white balance, auto exposure, auto focus), gamma correction, color gain adjustment and white balance. The reconfigurable pixel-processing unit further includes a look up table and a multiplier and accumulator (MAC). When one of the reconfigurable arithmetic units 200 is as a reconfigurable line register, the line register further includes a plurality of multiplexers and a plurality of line buffers. Each line buffer is coupled to the corresponding multiplexer. However, when one of the reconfigurable arithmetic units 200 is as a reconfigurable window register, the window register further includes a plurality of multiplexers and a plurality of registers. Each register is coupled to the corresponding multiplexer. Referring to FIG. 3, the single reconfigurable line register includes a multiplexer 302 and a line buffer 304. In FIG. 4, the 2×2 reconfigurable window register includes two multiplexers 402 and four registers 404, whereas in FIG. 5, the 3×3 reconfigurable window register includes three multiplexers 502 and nine registers 504.

Figure 6:
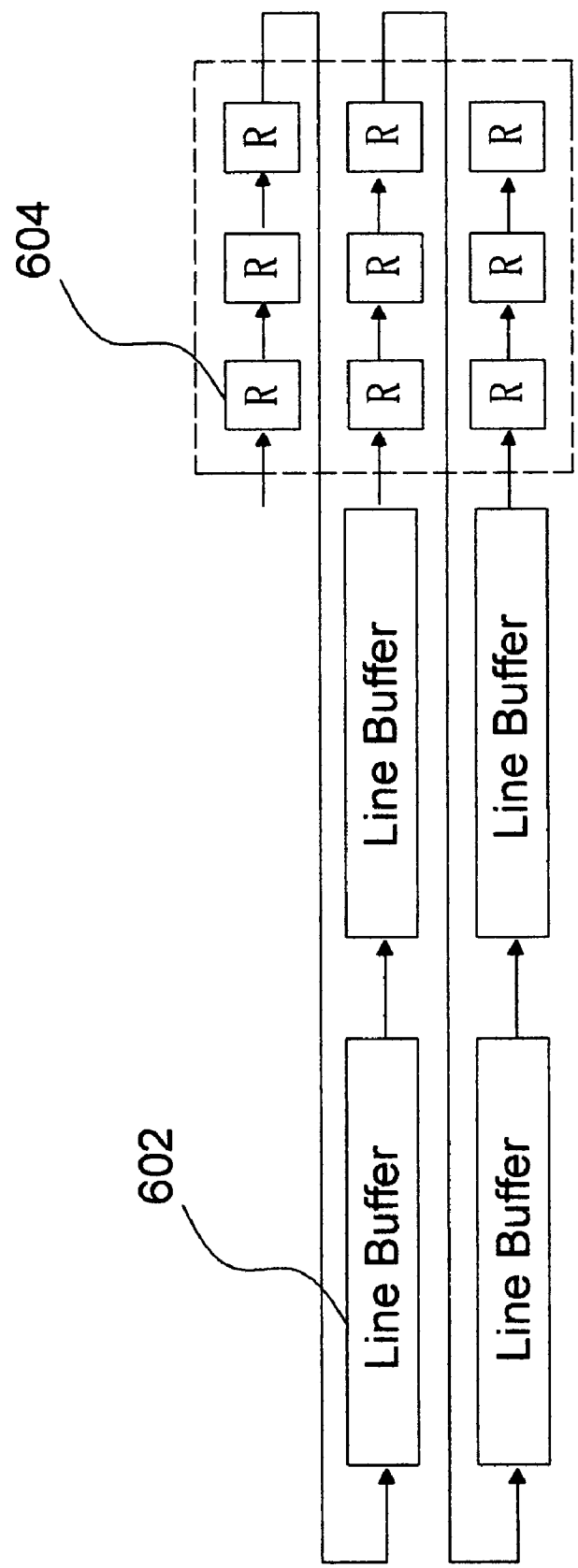
FIG. 6 shows a schematic view of the 3×3 cache register array made according to a preferred embodiment of the present invention.
Figure 7:
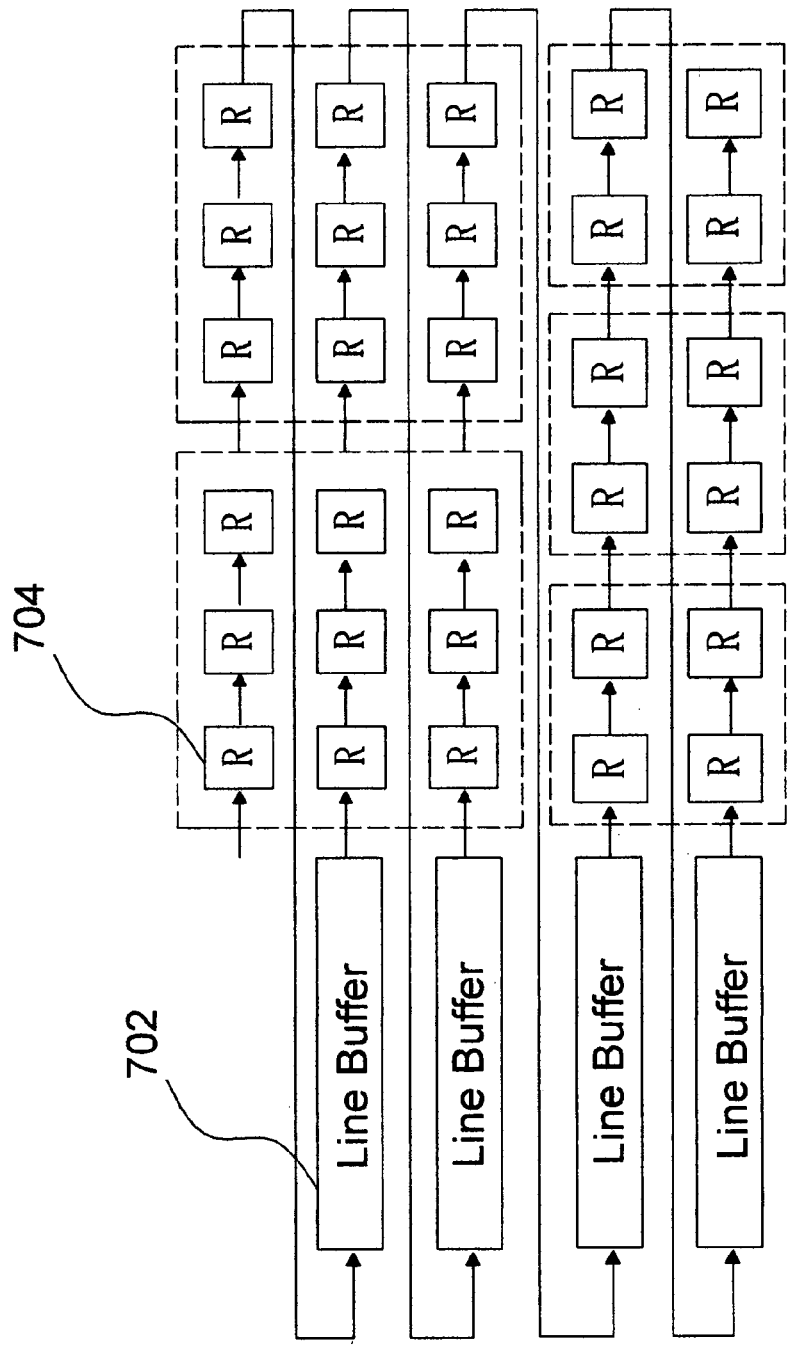
FIG. 7 shows a schematic view of the 5×6 cache register array made according to a preferred embodiment of the present invention.

Each of line registers is coupled to corresponding window registers to form an N×N cache register array for processing images with N×N window, wherein N is an integer. The line buffer is a lower-cost memory having to be addressed, but the register without addressing costs more and is capable of direct data access. Considering that the cache register array is formed by connecting the line buffers and the registers in series, the reconfigurable image processor can directly access two-dimensional image data once or for several times, without re-calculating the address of image data in the memory. In other words, the majority of image processing operations are performed by the window-based operation, such that the cache register array can effectively access the data before they are input to other reconfigurable arithmetic unit for operations. In FIG. 6, the 3×3 cache register array is formed by a plurality of line buffers 602 and registers 604, while in FIG. 7, the 5×6 cache register array is formed by a plurality of line buffers 702 and registers 704.

When one of the reconfigurable arithmetic units 200 is as a reconfigurable MAC, the reconfigurable MAC is formed by a plurality of MACs, an adder and a sorting network. When the reconfigurable arithmetic unit 200 is as a reconfigurable down-sampling module for minifying an image for displaying. When one of the reconfigurable arithmetic units 200 is as a reconfigurable ALU, the reconfigurable ALU includes at least a basic processing unit, which includes at least a comparator, an ALU and a multiplier. Also, the reconfigurable ALU can perform a specific program, which is stored in the first memory unit.

Figure 8:
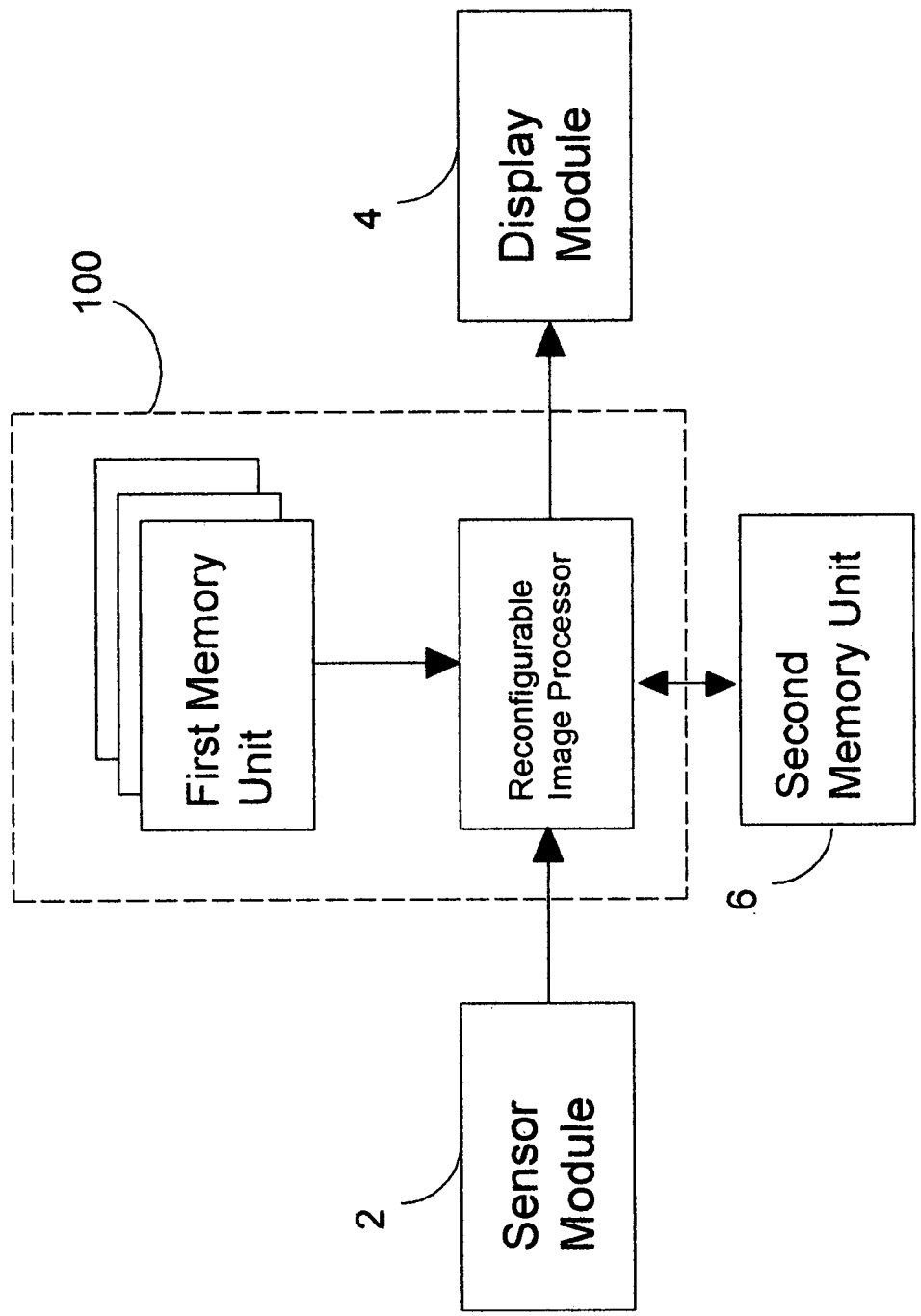
FIG. 8 is a block diagram showing the functions of the application architecture of the reconfigurable image processor made according to a preferred embodiment of the present invention.

Referring to FIGS. 8 and 1, the application architecture of the reconfigurable image processor includes a reconfigurable image processor 100 which is similar to FIG. 1, a sensor module 2, a display module 4 and a second memory unit 6, wherein the sensor module 2 captures raw sensor data. The reconfigurable image processor 100 having a first memory unit is coupled to a sensor module 2, a display module 4 and a second memory unit 6. The first memory unit stores at least one configuration. By setting different configurations, the reconfigurable image processor 100 reconfigures internal connections and internal arithmetic, such that the application architecture of the reconfigurable image processor performs corresponding actions and processes raw sensor data, wherein the sensor module 2 is a complementary metal oxide semiconductor (CMOS) component or a charge coupled device (CCD). The display module 4 is a liquid crystal display (LCD).

Figure 9:
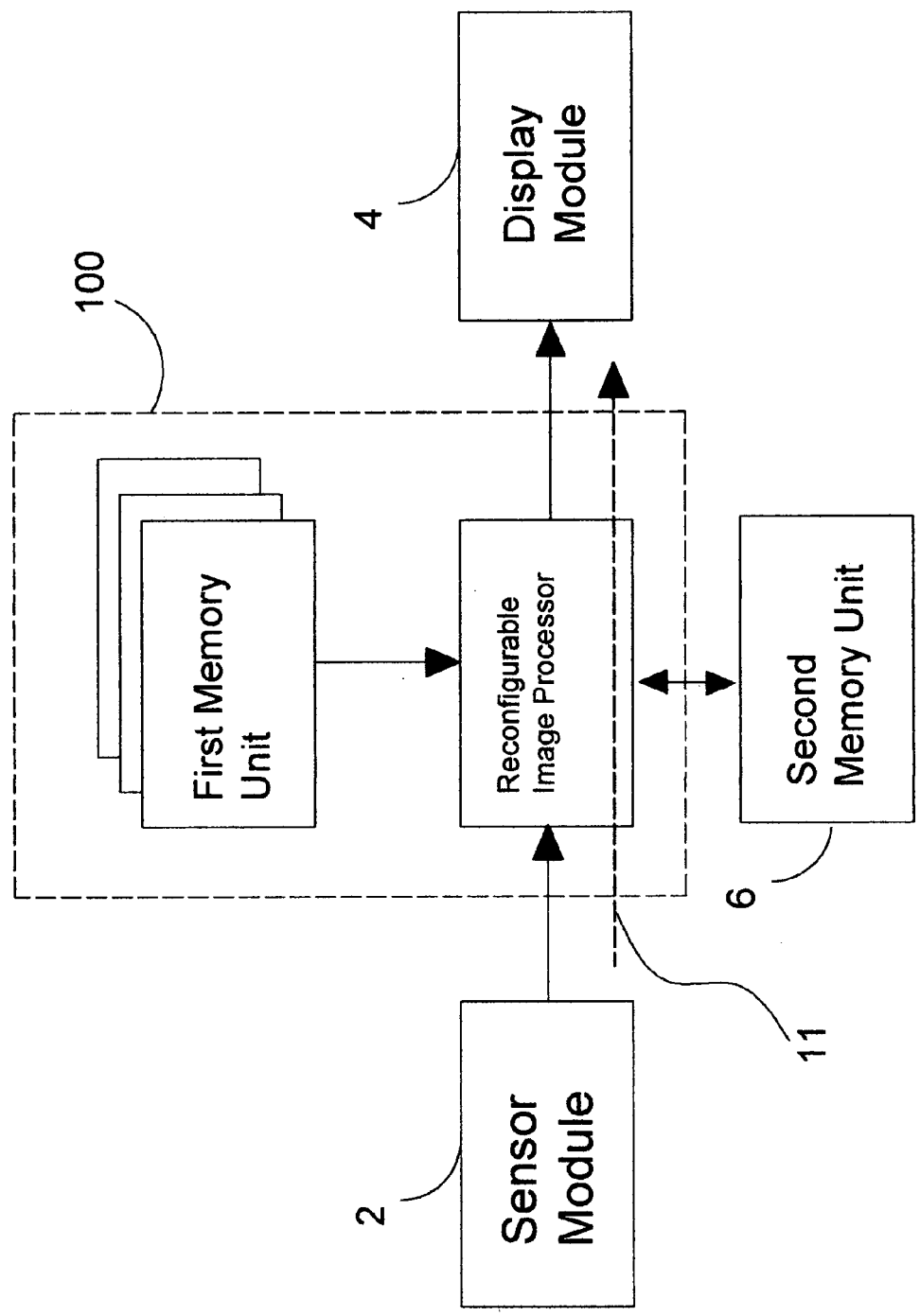
FIG. 9 is a schematic view showing the data flow of raw sensor data in the preview mode made according to a preferred embodiment of the present invention.

When the application architecture of the reconfigurable image processor 100 performs a preview mode, a corresponding configuration is loaded from the first memory unit into the reconfigurable image processor 100 to perform the required image processing procedure. The sensor module 2 then transfers raw sensor data into the reconfigurable image processor 100. First sensor data are obtained by processing the sensor data. After performing image-processing operations on the first sensor data for A times, preview images are obtained and then output to the display module 4, wherein $A \geq 0$ and A is an integer. In other words, the data flow of the raw sensor data is shown as dotted lines 11 in FIG. 9. As the raw sensor data are processed into the first sensor data having fewer pixels, and the first sensor data are processed by simpler algorithms, only a few reconfigurable arithmetic units are used. In this way, the preview images can be rapidly output to the display module 4. Considering that real-time images are necessary in the preview mode, the preview mode of this architecture has practical applications.

Figure 10:
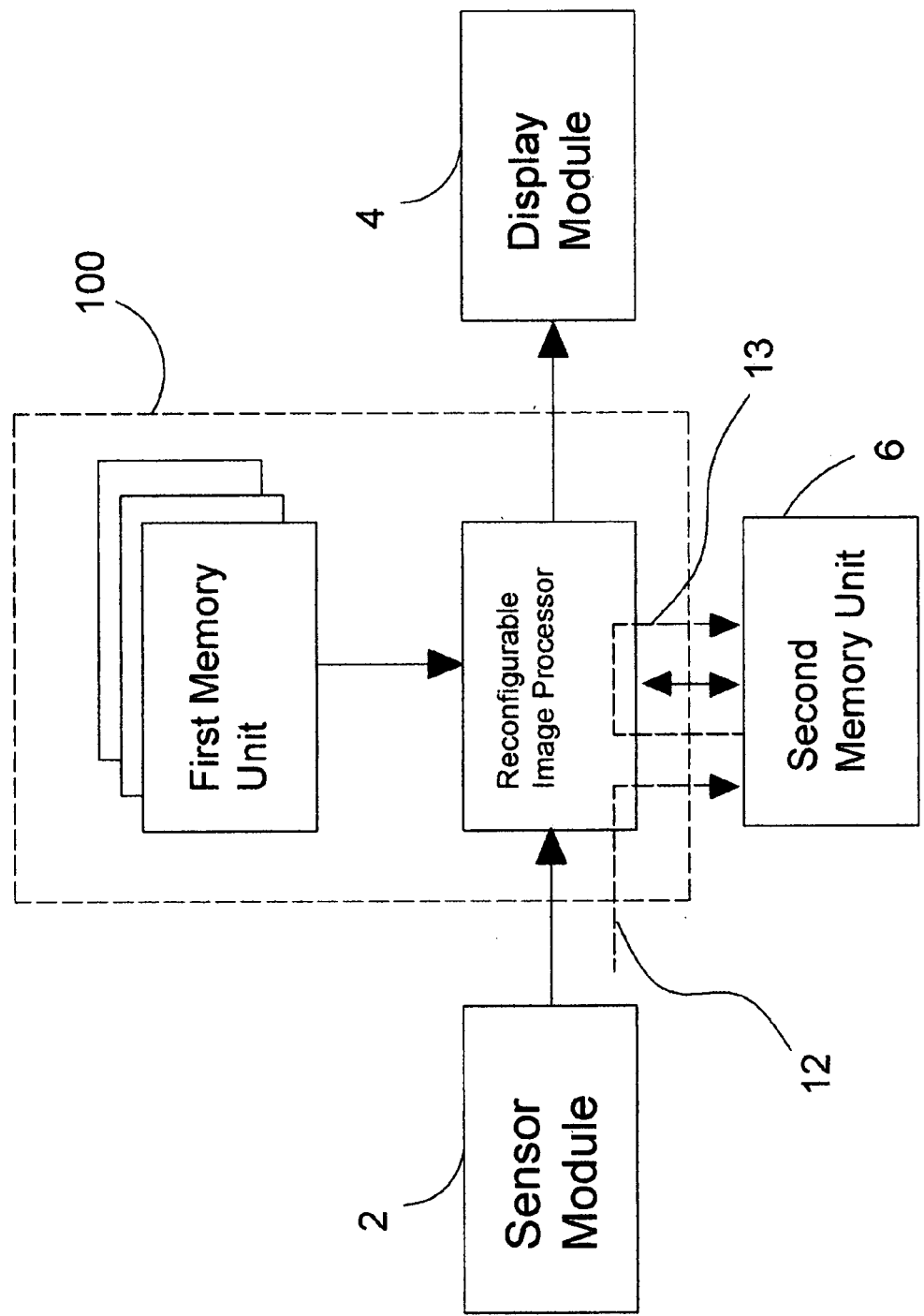
FIG. 10 is a schematic view showing the data flow of raw sensor data in the capture mode made according to a preferred embodiment of the present invention.

When the application architecture of the reconfigurable image processor 100 performs a capture mode, corresponding configurations are loaded from the first memory unit into the reconfigurable image processor 100 to perform the required image processing procedure. The sensor module 2 then transfers raw sensor data into the reconfigurable image processor 100. By processing the sensor data to acquire a second sensor data, and accessing the second memory unit 6, image processing operations are performed on the second sensor data with corresponding algorithms for B times to acquire captured images, then captured images are stored in the second memory unit 6, wherein $B \geq 1$ and B is an integer. In other words, the data flow of the raw sensor data is shown as dotted lines 12 and 13 in FIG. 10. Because the raw sensor data are processed into the second sensor data having more pixels, and the second sensor data are processed by multi-pass algorithms, the majority of reconfigurable arithmetic units are used, and the second memory unit 6 are accessed continually. In this way, the captured images are stored in the second memory unit 6. Consequently, more working time is required for the capture mode. Considering that real-time images are not necessary in the capture mode, the capture mode of this architecture has practical applications.

It is to be noted that the data volume of the second sensor data is greater than that of the first sensor data. By setting different configurations, this architecture completes data processing for the preview mode and the capture mode only via a single set of hardware.

Figure 11:
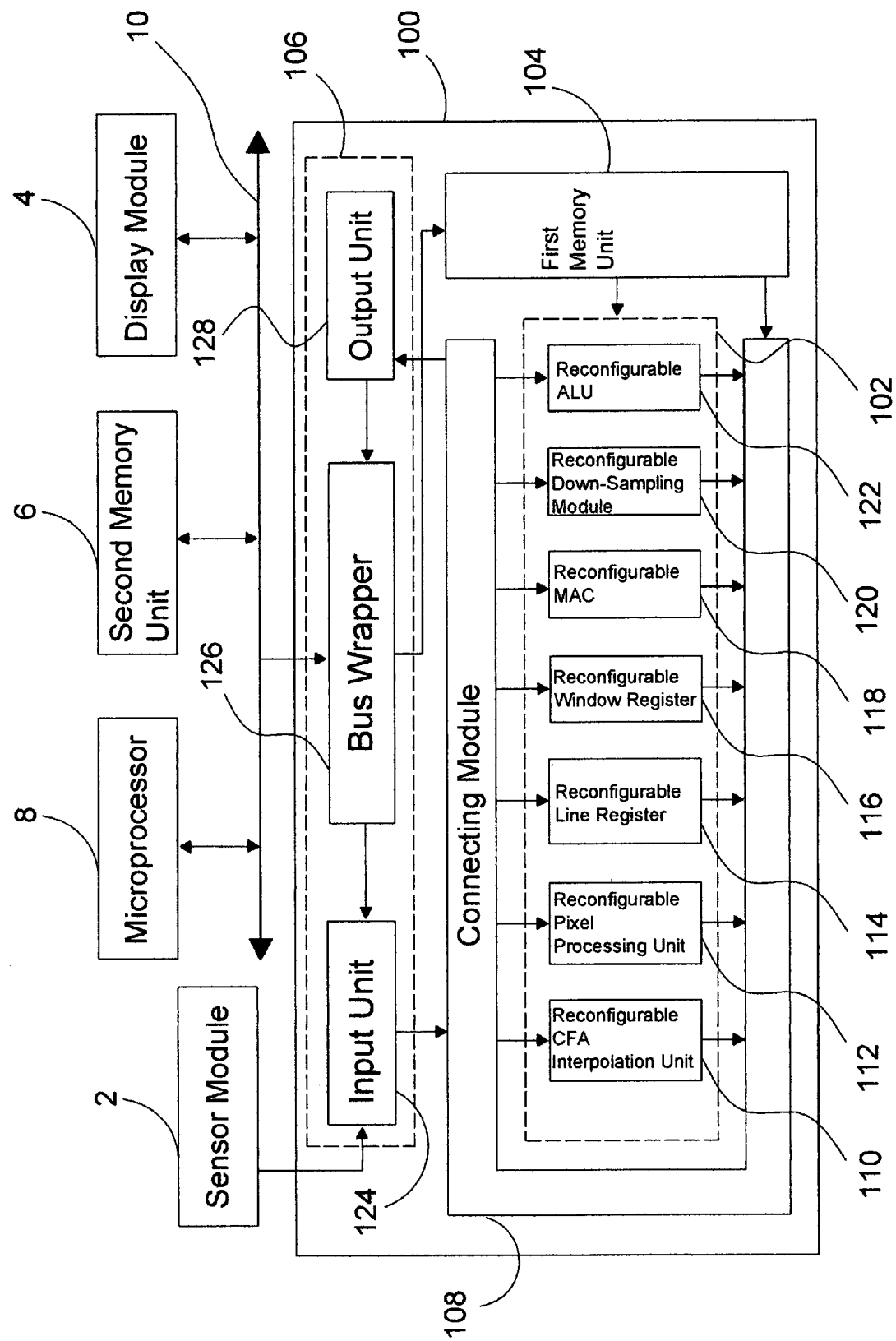
FIG. 11 is a block diagram showing the functions of the application architecture of the reconfigurable image processor made according to another preferred embodiment of the present invention.

Referring to FIGS. 11, 1 and 8, the reconfigurable image processor is coupled to at least one external microprocessor 8 via a system bus 10.

Figure 12:
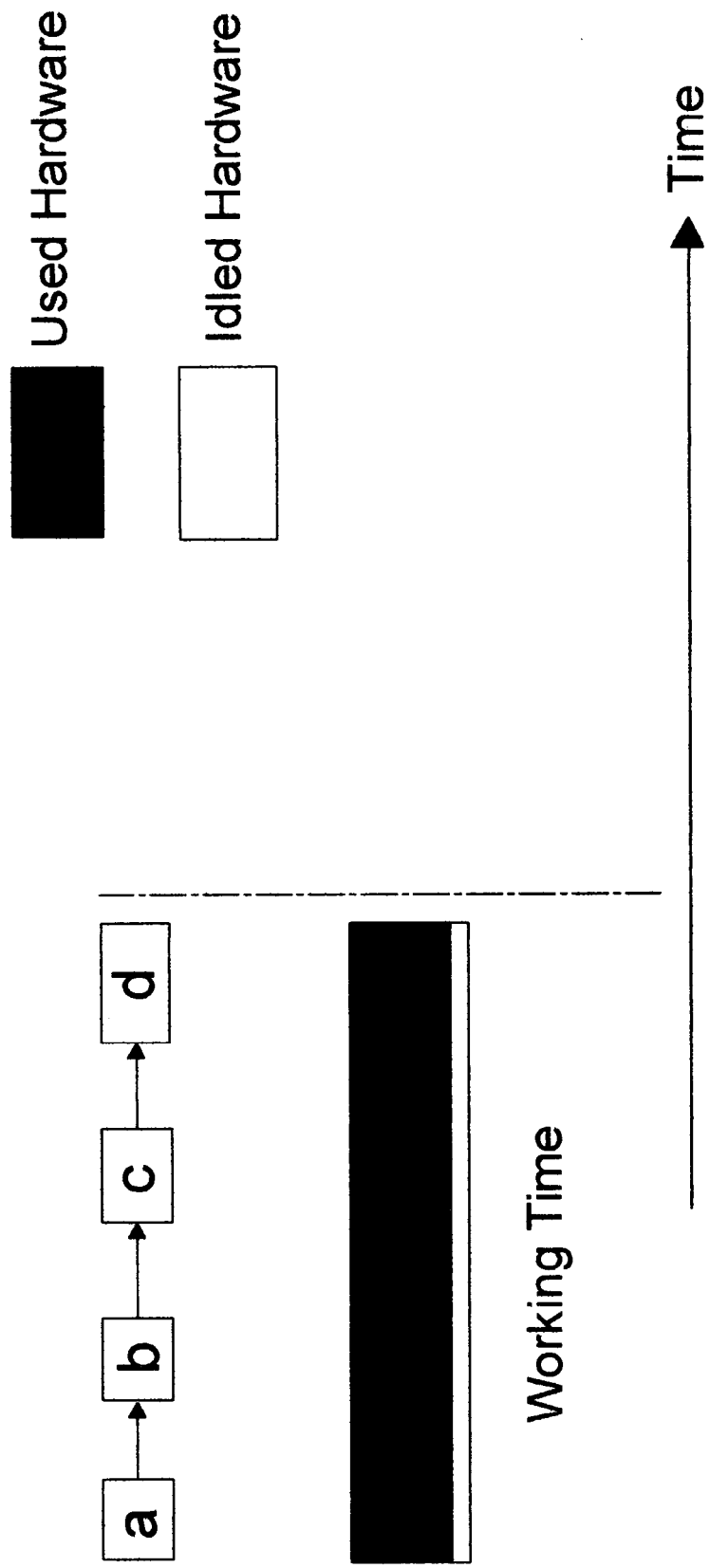
FIG. 12 is an illustration showing the usage of the reconfigurable image processor made according to a preferred embodiment of the present invention in the preview mode.

Referring to FIG. 12, because fewer pixels have to be processed in the preview mode, simpler algorithms are used. As a result, by setting the associated configurations, the reconfigurable image processor is configured into a preview engine to output real-time images to the display module 4 within a time frame.

Figure 13:
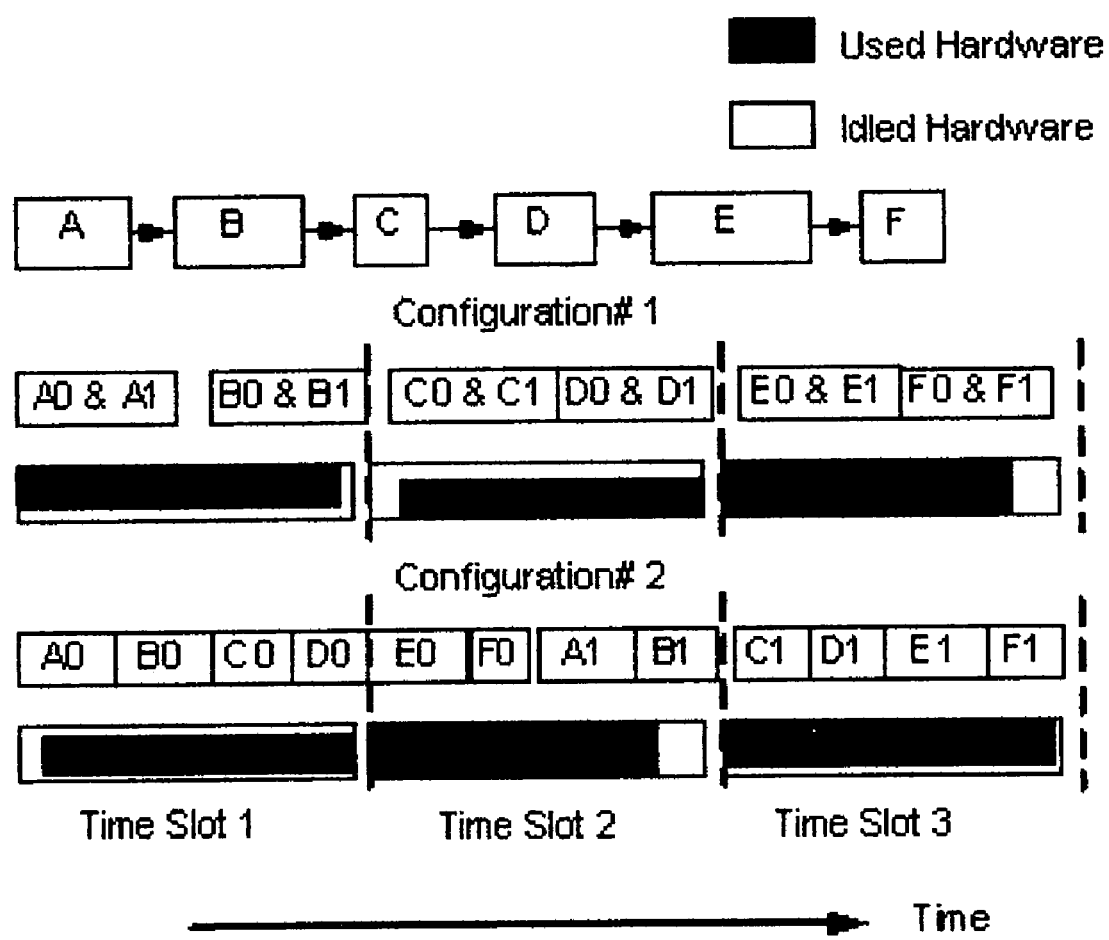
FIG. 13 is an illustration showing the usage of the reconfigurable image processor made according to another preferred embodiment of the present invention in capture mode.

Referring to FIG. 13, because more pixels have to be processed in the capture mode, more complicated algorithms are used. As a result, the reconfigurable image processor is configured into an image capture chip by setting corresponding configurations to configure as different hardware structures, and performing different algorithms for multi-pass image processes within different time frames. Because there is no requirement for real-time data processing during the capture mode, multi-pass processing is allowed. In this way, the hardware inside the reconfigurable image processor is repeatedly used for the preview mode and the capture mode, thereby greatly lowering costs of the hardware. Also, because the reconfigurable image processor is designed on the basis of image processing features, the reconfigurable image processor is more suitable for image processing due to optimum structure than digital signal processors (DSP), such that the present invention is possible to achieve higher processing speed.

Referring to FIG. 13, two types of configurations exist for multi-pass image data processing. It is assumed that six algorithms (ABCDEF) are needed, and an input image is divided into two areas: 0 and 1, wherein A0 refers to the performance of Operation A in Area 0; A1 refers to the performance of Operation A in Area 1; and so on. For the first method, the six algorithms (ABCDED) are loaded into the reconfigurable image processor 100 within different time frames, and the entire image is processed every time. For example, A0, A1, B0 and B1 are processed within the first time frame; followed by the processing of C0, C1, D0 and D1 within the second time frame and the processing of E0, E1, F0 and F1 within the third time frame. As for the second method, Area 0 is processed before Area 1. For example, A0, B0, C0 and D0 are processed within the first time frame; followed by the processing of E0, F0, A1 and B1 within the second time frame and the processing of C1, D1, E1 and F1 within the third time frame. By setting different configurations, the reconfigurable image processor flexibly changes the functions of internal hardware to perform different algorithms, thereby effectively lowering costs of the hardware.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reconfigurable image processor for image processing, comprising:
   an arithmetic module, having a plurality of reconfigurable arithmetic units reconfigured to perform corresponding data processing actions;
   a first memory unit, coupled to said arithmetic module, storing at least one configuration;
   a bus control module, coupled to said first memory unit and a system bus for being coupled to an external device; and
   a connecting module, coupled to said arithmetic module, said first memory unit and said bus control module, wherein said connecting module reconfigures connections among said reconfigurable arithmetic units via said configuration,
   wherein said reconfigurable arithmetic units individually comprise:
   a context register, coupled to said first memory unit;
   an input source selector, coupled to said connecting module and said context register;
   a datapath unit, coupled to said context register and said input source selector for performing data operations;
   an output register, coupled to said connecting module and said datapath unit for storing output data; and
   a module controller, coupled to said context register, said datapath unit and said output register.

2. The reconfigurable image processor as claimed in claim 1, wherein said bus control module comprises:
   an input unit, coupled to said connecting module;
   an output unit, coupled to said connecting module; and
   a bus wrapper, coupled to said input unit, said output unit, said first memory unit and said system bus.

3. The reconfigurable image processor as claimed in claim 1, wherein said connecting module comprises a plurality of multiplexers.

4. The reconfigurable image processor as claimed in claim 3, wherein said multiplexers are controlled via said configuration, such that said connecting module reconfigures connections among said reconfigurable arithmetic units.

5. The reconfigurable image processor as claimed in claim 1, wherein said first memory unit comprises at least one context memory.

6. The reconfigurable image processor as claimed in claim 1, wherein a first synchronous signal is outputted into said module controller.

7. The reconfigurable image processor as claimed in claim 1, wherein said module controller outputs a second synchronous signal.

8. The reconfigurable image processor as claimed in claim 1, wherein when said reconfigurable arithmetic unit processes arithmetic data and said first synchronous signal, said module controller analyzes said first synchronous signal and controls said datapath unit so as to retrieve valid data within a time frame and generate a second synchronous signal to the next stage.

9. The reconfigurable image processor as claimed in claim 1, wherein said input source selector, said datapath unit, said output register and said module controller are individually controlled via said configuration inside said context register, to individually perform corresponding actions.

10. The reconfigurable image processor as claimed in claim 1, wherein one of said reconfigurable arithmetic units is a reconfigurable color filter array (CFA) interpolation unit for transferring Bayer pattern data into RGB data.

11. The reconfigurable image processor as claimed in claim 10, wherein said reconfigurable CFA interpolation unit comprises a first interpolation operator, a second interpolation operator and a third interpolation operator; said first interpolation operator performs diagonal data operations of a Bayer color filter array (CFA), said second interpolation operator performs cross-data operations of said Bayer CFA, and said third interpolation operator performs final operations.

12. The reconfigurable image processor as claimed in claim 1, wherein one of said reconfigurable arithmetic units is a reconfigurable pixel processing unit for performing a plurality of image processing operations, which comprise at least color correction, brightness/contrast enhancement, hue/saturation enhancement, measurement for 3A (auto white balance, auto exposure, auto focus), gamma correction, color gain adjustment or white balance.

13. The reconfigurable image processor as claimed in claim 12, wherein said reconfigurable pixel processing unit comprises a look up table and a multiplier and accumulator (MAC).

14. The reconfigurable image processor as claimed in claim 1, wherein one of said reconfigurable arithmetic units is a reconfigurable line register, which comprises:
   a plurality of multiplexers; and
   a plurality of line buffers, coupled to said corresponding multiplexers.

15. The reconfigurable image processor as claimed in claim 14, wherein one of said line buffer comprises registers.

16. The reconfigurable image processor as claimed in claim 1, wherein one of said reconfigurable arithmetic units is a reconfigurable window register, which comprises:
   a plurality of multiplexers; and
   a plurality of registers, coupled to said corresponding multiplexers.

17. The reconfigurable image processor as claimed in claim 16, wherein more than one of said registers comprises memory.

18. The reconfigurable image processor as claimed in claim 1, wherein a plurality of line registers are coupled to a plurality of corresponding window registers to form an N×N cache register array to process image data with different window sizes, wherein N is an integer.

19. The reconfigurable image processor as claimed in claim 1, wherein one of said reconfigurable arithmetic units is a reconfigurable multiplier and accumulator (MAC), which comprises a plurality of MACs, an adder and a sorting network.

20. The reconfigurable image processor as claimed in claim 1, wherein one of said reconfigurable arithmetic units is a reconfigurable down-sampling module capable of minifying an image.

21. The reconfigurable image processor as claimed in claim 1, wherein one of said reconfigurable arithmetic units is a reconfigurable arithmetic and logic unit (ALU), having at least a basic processing unit, which comprises at least a comparator, an arithmetic and logic unit (ALU) and a multiplier.

22. The reconfigurable image processor as claimed in claim 21, wherein said reconfigurable ALU performs a specific program, which is stored in said first memory unit.

23. An application architecture of an reconfigurable image processor for image processing, comprising:
a sensor module for capturing a raw sensor data;
a display module;
a second memory unit; and
a reconfigurable image processor coupled to said sensor module, said display module and said second memory unit, and having an arithmetic module, a first memory unit for storing at least one configuration, and a connecting module coupled to the first memory module, by setting different configurations, said connecting module reconfiguring internal connections of arithmetic module to perform corresponding actions and process said raw sensor data
wherein said arithmetic module comprises a plurality of reconfigurable arithmetic units reconfigured to perform corresponding data processing actions, each of the reconfigurable arithmetic unit comprising:
a context register, coupled to said first memory unit;
an input source selector, coupled to said connecting module and said context register;
a datapath unit, coupled to said context register and said input source selector for performing data operations;
an output register, coupled to said connecting module and said datapath unit for storing output data; and
a module controller, coupled to said context register, said datapath unit and said output register.

24. The application architecture of the reconfigurable image processor for image processing as claimed in claim 23, wherein when performing a preview mode, at least one said corresponding configuration is loaded from said first memory unit to said reconfigurable image processor; after said sensor module inputs a raw sensor data into said reconfigurable image processor, first sensor data are obtained by processing said raw sensor data; after performing image processing operations on said first sensor data for A times, a preview image is obtained and then transferred into said display module, wherein $A \geq 0$ and A is an integer.

25. The application architecture of the reconfigurable image processor for image processing as claimed in claim 23, wherein when performing a capture mode, said corresponding configurations are loaded from said first memory unit to said reconfigurable image processor; after said sensor module inputs a raw sensor data into said reconfigurable image processor, by processing said raw sensor data and accessing said second memory unit for B times, a captured image is obtained on a second sensor data, and then stored in said second memory unit, wherein $B \geq 1$ and B is an integer.

26. The application architecture of the reconfigurable image processor for image processing as claimed in claim 23, wherein data volume of said second sensor data is greater than that of said first sensor data.

27. The application architecture of the reconfigurable image processor for image processing as claimed in claim 23, wherein said sensor module is a complementary metal oxide semiconductor (CMOS) component or a charge coupled device (CCD).

28. The application architecture of the reconfigurable image processor for image processing as claimed in claim 23, wherein said display module comprises a liquid crystal display (LCD).

29. The application architecture of the reconfigurable image processor for image processing as claimed in claim 23, wherein said reconfigurable image processor further comprises:
a bus control module, coupled to said first memory unit and
a system bus for being coupled to an external device,
wherein the connecting module is coupled to said arithmetic module, said first memory unit and said bus control module.

30. The application architecture of the reconfigurable image processor for image processing as claimed in claim 29, wherein said bus control module comprises:
an input unit, coupled to said connecting module;
an output unit, coupled to said connecting module; and
a bus wrapper, coupled to said input unit, said output unit, said first memory unit and said system bus.

31. The application architecture of the reconfigurable image processor for image processing as claimed in claim 29, wherein said connecting module comprises a plurality of multiplexers.

32. The application architecture of the reconfigurable image processor for image processing as claimed in claim 31, wherein said multiplexers are controlled via said configuration, such that said connecting module reconfigures connections among said reconfigurable arithmetic units.

33. The application architecture of the reconfigurable image processor for image processing as claimed in claim 29, wherein said first memory unit comprises at least one context memory.

34. The application architecture of the reconfigurable image processor for image processing as claimed in claim 23, wherein a first synchronous signal is outputted into said module controller.

35. The application architecture of the reconfigurable image processor for image processing as claimed in claim 23, wherein said module controller outputs a second synchronous signal.

36. The application architecture of the reconfigurable image processor for image processing as claimed in claim 23, wherein when said reconfigurable arithmetic unit processes data and said first synchronous signal, said module controller analyzes said first synchronous signal and controls said datapath unit so as to retrieve valid data within a time frame and generate a second synchronous signal to the next stage.

37. The application architecture of the reconfigurable image processor for image processing as claimed in claim 23, wherein said input source selector, said datapath unit, said output register and said module controller are individually controlled via said configuration inside said context register so as to individually perform corresponding actions.

38. The application architecture of the reconfigurable image processor for image processing as claimed in claim 29, wherein one of said reconfigurable arithmetic units is a reconfigurable color filter array (CFA) interpolation unit for transferring Bayer pattern data into RGB data.

39. The application architecture of the reconfigurable image processor for image processing as claimed in claim 38, wherein said reconfigurable CFA interpolation unit comprises a first interpolation operator, a second interpolation operator and a third interpolation operator; said first interpolation operator performs diagonal data operations of a Bayer color filter array (CFA), said second interpolation operator performs cross-data operations of said Bayer CFA, and said third interpolation operator performs final operations.

40. The application architecture of the reconfigurable image processor for image processing as claimed in claim 29, wherein one of said reconfigurable arithmetic units is a reconfigurable pixel processing unit for performing a plurality of image processing operations, which comprise at least color correction, brightness/contrast enhancement, hue/saturation enhancement, measurement for 3A (auto white balance, auto exposure, auto focus), gamma correction, color gain adjustment or white balance.

41. The application architecture of the reconfigurable image processor for image processing as claimed in claim 40, wherein said reconfigurable pixel processing unit comprises a look up table and a multiplier and accumulator (MAC).

42. The application architecture of the reconfigurable image processor for image processing as claimed in claim 29, wherein one of said reconfigurable arithmetic units is a reconfigurable line register, which comprises:
a plurality of multiplexers; and
a plurality of line buffers, coupled to said corresponding multiplexers.

43. The reconfigurable image processor as claimed in claim 42, wherein one of said line buffer comprises registers.

44. The application architecture of the reconfigurable image processor for image processing as claimed in claim 29, wherein one of said reconfigurable arithmetic units is a reconfigurable window register, which comprises:
a plurality of multiplexers; and
a plurality of registers, coupled to said corresponding multiplexers.

45. The reconfigurable image processor as claimed in claim 44, wherein more than one of said registers comprises memory.

46. The application architecture of the reconfigurable image processor for image processing as claimed in claim 29, wherein said plurality of line registers are coupled to said plurality of corresponding window registers to form an N×N cache register array to process image data with different window sizes, wherein N is an integer.

47. The application architecture of the reconfigurable image processor for image processing as claimed in claim 29, wherein one of said reconfigurable arithmetic units is a reconfigurable multiplier and accumulator (MAC), which comprises a plurality of MACs, an adder and a sorting network.

48. The application architecture of the reconfigurable image processor for image processing as claimed in claim 29, wherein one of said reconfigurable arithmetic units is a reconfigurable down-sampling module capable of minifying an image.

49. The application architecture of the reconfigurable image processor for image processing as claimed in claim 29, wherein one of said reconfigurable arithmetic units is a reconfigurable arithmetic and logic unit (ALU), having at least a basic processing unit, which comprises at least a comparator, an arithmetic and logic unit (ALU) and a multiplier.

50. The application architecture of the reconfigurable image processor for image processing as claimed in claim 49, wherein said reconfigurable ALU performs a specific program, which is stored in said first memory unit.

51. The application architecture of the reconfigurable image processor for image processing as claimed in claim 23, wherein the reconfigurable image processor is coupled to at least an external microprocessor via a system bus.

52. An application architecture of a reconfigurable image processor for image processing, comprising:
a sensor module for capturing a raw sensor data;
a display module;
a second memory unit; and
a reconfigurable image processor coupled to said sensor module, said display module and said second memory unit, and having a first memory unit for storing at least one configuration; by setting different configurations, said reconfigurable image processor reconfigures internal connections to perform corresponding actions and process said raw sensor data,
wherein when performing a preview mode, at least one said corresponding configuration is loaded from said first memory unit to said reconfigurable image processor; after said sensor module inputs a raw sensor data into said reconfigurable image processor, first sensor data are obtained by processing said raw sensor data; after performing image processing operations on said first sensor data for A times, a preview image is obtained and then transferred into said display module, wherein $A \geqq 0$ and A is an integer.

53. An application architecture of a reconfigurable image processor for image processing, comprising:
a sensor module for capturing a raw sensor data;
a display module;
a second memory unit; and
a reconfigurable image processor coupled to said sensor module, said display module and said second memory unit, and having a first memory unit for storing at least one configuration; by setting different configurations, said reconfigurable image processor reconfigures internal connections to perform corresponding actions and process said raw sensor data,
wherein when performing a capture mode, said corresponding configurations are loaded from said first memory unit to said reconfigurable image processor; after said sensor module inputs a raw sensor data into said reconfigurable image processor, by processing said raw sensor data and accessing said second memory unit for B times, a captured image is obtained on a second sensor data, and then stored in said second memory unit, wherein $B \geqq 1$ and B is an integer.

* * * * *

UNITED STATES PATENT AND TRADEMARK OFFICE
CERTIFICATE OF CORRECTION

PATENT NO. : 8,027,551 B2  
APPLICATION NO. : 11/806623  
DATED : September 27, 2011  
INVENTOR(S) : Shao Yi Chien et al.

Page 1 of 1

It is certified that error appears in the above-identified patent and that said Letters Patent is hereby corrected as shown below:

ON THE TITLE PAGE:

At item (73), Assignee, change:

"(73) Assignee: Vivotek Inc., Taipei (TW)"

to

--(73) Assignees: Vivotek Inc., Chung-Ho City, Taipei County (TW); National Taiwan University, Taipei (TW)--.

Signed and Sealed this  
Seventh Day of February, 2012

David J. Kappos  
*Director of the United States Patent and Trademark Office*